US009639972B2

(12) United States Patent
Ebisawa et al.

(10) Patent No.: US 9,639,972 B2
(45) Date of Patent: May 2, 2017

(54) COMPUTER-READABLE STORAGE MEDIUM HAVING STORED THEREIN DISPLAY CONTROL PROGRAM, DISPLAY CONTROL APPARATUS, DISPLAY CONTROL METHOD, AND DISPLAY CONTROL SYSTEM FOR PERFORMING DISPLAY CONTROL OF A DISPLAY APPARATUS CAPABLE OF STEREOSCOPIC DISPLAY

(75) Inventors: Yasushi Ebisawa, Kyoto (JP); Eiji Mukao, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 680 days.

(21) Appl. No.: 13/028,329

(22) Filed: Feb. 16, 2011

(65) Prior Publication Data
US 2012/0146993 A1    Jun. 14, 2012

(30) Foreign Application Priority Data
Dec. 10, 2010    (JP) ................................. 2010-276241

(51) Int. Cl.
*G06T 15/04*    (2011.01)
*G06T 15/50*    (2011.01)

(52) U.S. Cl.
CPC ............ *G06T 15/04* (2013.01); *G06T 15/503* (2013.01); *G06T 2210/62* (2013.01)

(58) Field of Classification Search
USPC ....................................................... 345/592
See application file for complete search history.

(56) References Cited

U.S. PATENT DOCUMENTS 6,326,964 B1 *  12/2001  Snyder et al. ................ 345/419
6,760,024 B1 *   7/2004  Lokovic et al. .............. 345/421
(Continued)

FOREIGN PATENT DOCUMENTS

| JP | 03-119889 | 5/1991 |
| JP | 2000-348196 | 12/2000 |
| JP | 2005-252459 | 9/2005 |

OTHER PUBLICATIONS

Rogers, Douglas, "Implementing Fog in Direct3D" Last updated Jan. 2000, NVIDIA Corporation.*

(Continued)

*Primary Examiner* — Vu Nguyen
(74) *Attorney, Agent, or Firm* — Nixon & Vanderhye, P.C.

(57) ABSTRACT

A display control program executed by a computer of a display control apparatus displaying a virtual space on a display apparatus capable of stereoscopic display, the display control program causing the computer to function as: object placement means for placing an object in the virtual space; transparency degree setting means for calculating a distance specified between the object displayed in the virtual space, and a viewpoint position based on the position of a virtual camera for virtually shooting the virtual space, and setting the degree of transparency of the object such that the longer the distance is, the higher the degree of transparency is; image generation means for generating right-eye and left-eye images by shooting the virtual space with right and left virtual cameras, respectively; and display control means for displaying the right-eye and left-eye images generated by the image generation means, on the display apparatus.

19 Claims, 9 Drawing Sheets

(56) References Cited

U.S. PATENT DOCUMENTS

| | | | |
|---|---|---|---|
| 8,300,086 B2* | 10/2012 | Pockett et al. | 348/42 |
| 2005/0195478 A1 | 9/2005 | Yanagawa et al. | |
| 2005/0253924 A1* | 11/2005 | Mashitani | 348/42 |
| 2009/0219283 A1* | 9/2009 | Hendrickson et al. | 345/420 |
| 2010/0020160 A1* | 1/2010 | Ashbey | 348/43 |
| 2010/0039504 A1* | 2/2010 | Takahashi et al. | 348/54 |
| 2011/0018982 A1* | 1/2011 | Shibamiya et al. | 348/54 |

OTHER PUBLICATIONS

Barla, Pascal, Joëlle Thollot, and Lee Markosian. "X-toon: an extended toon shader." Proceedings of the 4th international symposium on Non-photorealistic animation and rendering. ACM, 2006.*

"Doc:2.4/Manual/World/Mist."—BlenderWiki. Blender, Sep. 25, 2009. Web. Mar. 14, 2014. <http://wiki.blender.org/index.php?title=Doc:2.4/Manual/World/Mist&oldid=84716>.*

* cited by examiner

COMPUTER-READABLE STORAGE MEDIUM HAVING STORED THEREIN DISPLAY CONTROL PROGRAM, DISPLAY CONTROL APPARATUS, DISPLAY CONTROL METHOD, AND DISPLAY CONTROL SYSTEM FOR PERFORMING DISPLAY CONTROL OF A DISPLAY APPARATUS CAPABLE OF STEREOSCOPIC DISPLAY

CROSS REFERENCE TO RELATED APPLICATION

The disclosure of Japanese Patent Application No. 2010-276241, filed on Dec. 10, 2010, is incorporated herein by reference.

BACKGROUND OF THE INVENTION

Field of the Invention

The present invention relates to a computer-readable storage medium having stored therein a display control program, a display control apparatus, a display control method, and a display control system. More specifically, the present invention relates to a computer-readable storage medium having stored therein a display control program for performing display control of a display apparatus capable of stereoscopic display, a display control apparatus, a display control method, and a display control system.

Description of the Background Art

A display apparatus capable of stereoscopic display provides an object image such that the object image can be perceived as a 3-dimensional image with depth. The display apparatus capable of stereoscopic display provides a user with a sense of depth in a 3-dimensional image, by using phenomena such as binocular parallax (difference in apparent positions when the same point is looked at by a right eye and a left eye), motion parallax, convergence, and focusing.

Examples of conventional display apparatuses capable of stereoscopic display include a stereoscopic image display apparatus using a parallax barrier method. The stereoscopic image display apparatus using the parallax barrier method includes a liquid crystal parallax barrier provided on the front surface of a liquid crystal panel as disclosed in Japanese Laid-Open Patent Publication No. H03-119889, for example. The stereoscopic image display apparatus controls a voltage applied to the liquid crystal parallax barrier to change the degree of transparency of a light shielding section of the liquid crystal parallax barrier, thereby enabling a 2-dimensional (2D) image display and a 3-dimensional (3D) image display to be switched therebetween.

Conventional display apparatuses capable of stereoscopic display such as the above stereoscopic image display apparatus generate an image for a left eye and an image for a right eye for providing 3D image display. The image for a left eye and the image for a right eye are generated so as to cause the eyes' horizontal separation derived difference (binocular disparity) therebetween when they are presented to the user in an appropriate manner.

However, in some cases, the image for a left eye and the image for a right eye might be provided with an undesired difference being caused, besides a difference necessary for appropriately providing a stereoscopic view. For example, in the case where the same object included in each image has a narrow length in the horizontal direction associated with binocular disparity, the same objects that have been subjected to perspective transformation processing might be displayed with several portions thereof disappearing, in different display manners between the image for a left eye and the image for a right eye, owing to positional relationships between the same objects and the viewpoint.

SUMMARY OF THE INVENTION

When such a phenomenon as described above occurs, the user might feel a sense of discomfort by the phenomenon being perceived as blinking of a displayed object, for example. Therefore, it has been desired to provide a program or the like capable of display control for eliminating such a sense of discomfort in stereoscopic viewing.

The present invention can be provided, as an example, in the following aspects, in order to attain the object mentioned above. The following specific description is in all aspects illustrative for the understanding of the present invention, and is not intended to be limited thereto. That is, it is understood that, from the specific description, the one skilled in the art can implement the present invention in the equivalent range based on the description of the present invention and on the common technological knowledge.

In one aspect, the present invention provides a computer-readable storage medium having stored therein a display control program which is executed by a computer of a display control apparatus that displays a predetermined virtual space on a display apparatus capable of stereoscopic display. Here, the display control program causes the computer to function as: object placement means; transparency degree setting means; image generation means; and display control means.

The object placement means places a predetermined object in the virtual space. In accordance with a distance specified between the predetermined object placed in the virtual space, and a viewpoint position based on the position of a virtual camera used for virtually shooting the virtual space, the transparency degree setting means sets the degree of transparency of a part or the entirety of the predetermined object such that the longer the distance is, the higher the degree of transparency is. The image generation means for generating an image for a right eye and an image for a left eye by shooting the virtual space with a right virtual camera and a left virtual camera, respectively. Here, the predetermined object, which is included in each of the image for a right eye and the image for a left eye, has the degree of transparency set by the transparency degree setting means. The display control means displays the image for a right eye and the image for a left eye generated by the image generation means, on the display apparatus.

As used herein, a "virtual camera" is a concept corresponding to a viewpoint for projecting, on a predetermined projection surface, a 3-dimensional virtual space including a given 3-dimensional virtual object by perspective transformation processing. By specifying the position of the "virtual camera", a perspective image based on any viewpoint is provided. As the "virtual camera", a "right virtual camera" and a "left virtual camera" respectively correspond to viewpoints for generating an image for a right eye and an image for a left eye for providing a stereoscopic view.

In one embodiment, the transparency degree setting means sets the degree of transparency of the predetermined object such that a display manner on the display apparatus of the predetermined object in the image for a right eye, and a display manner on the display apparatus of the predetermined object in the image for a left eye are equivalent.

Here, a "display manner on the display apparatus" of an object in each of an image for a right eye and an image for a left eye, indicates a manner in which the entirety or a portion of an object in each image displayed on the display apparatus is visible to an observer via the display apparatus. In addition, the expression that a display manner on the display apparatus of an object in the image for a right eye, and a display manner on the display apparatus of the object in the image for a left eye are "equivalent", indicates that there is substantially no difference other than a binocular disparity necessary for providing a stereoscopic view, between the image for a right eye and the image for a left eye. Here, the expression "there is substantially no difference" is used with the following intention. That is, even if there is some difference, in a precise sense, between an image for a right eye and an image for a left eye, it is considered that there is no difference as long as the effect caused by the characteristics (for example, the degree of transparency) of the images prevents an observer from perceiving artifact, a sense of discomfort, or the like due to the difference.

In another embodiment, the transparency degree setting means sets the degree of transparency in attribute data of a model specifying the predetermined object.

In another embodiment, the transparency degree setting means sets the degree of transparency of a texture image to be mapped to the predetermined object.

In another embodiment, the transparency degree setting means includes texture image selection means for, based on the distance specified between the viewpoint position and the predetermined object, selecting one or more texture images from a plurality of texture images, having respective degrees of transparency, that are prepared in advance.

In another embodiment, the plurality of texture images are mipmaps.

In another embodiment, the predetermined object has at least a portion whose length in a horizontal direction associated with binocular disparity caused when the image for a right eye and the image for a left eye are generated, is narrow relative to the length in the horizontal direction of a display area of the display apparatus. Here, the length of the portion, which is relatively narrow, may correspond to the length in the horizontal direction of unit display area in the display area.

In another embodiment, the display control program further causes the computer to function as object determination means for determining whether or not the predetermined object has a portion whose length in the horizontal direction associated with binocular disparity caused when the image for a right eye and the image for a left eye are generated, is narrow relative to the length in the horizontal direction, of the display area of the display apparatus. The transparency degree setting means sets the degree of transparency of the predetermined object in accordance with the distance, when the object determination means has determined that the predetermined object has the portion whose length in the horizontal direction is relatively narrow.

In another embodiment, the viewpoint position is the position of the right virtual camera or the position of the left virtual camera.

In another embodiment, the viewpoint position is the midpoint between the position of the right virtual camera and the position of the left virtual camera.

In another embodiment, the transparency degree setting means sets the degree of transparency of the predetermined object such that the degree of transparency increases by a certain amount as the length specified between the viewpoint and the predetermined object increases by a certain amount.

In addition, in another aspect, the computer-readable storage medium having stored therein the display control program may be used as an apparatus for executing the display control program, or a system including one or more apparatuses that can communicate with each other. In addition, the present invention includes a method implemented in the computer-readable storage medium having stored therein the display control program, the apparatus, or the system.

It is noted that, as used herein, the term "computer-readable storage medium" indicates any apparatus or medium capable of storing a program, a code, and/or data to be used in a computer system. The computer-readable storage medium may be any one of a volatile device and a nonvolatile device as long as it can be read by a computer system. Examples of computer-readable storage media include a magnetic tape, a hard disc drive (HDD), a compact disc (CD), a digital versatile disc (DVD), a Blu-ray disc (BD), a semiconductor memory, but the present invention is not limited thereto.

In addition, as used herein, the term "system" (for example, a game system, or an information processing system) may include one apparatus, or may include a plurality of apparatuses each of which can communicate with another one of the apparatuses.

The present invention makes it possible to display an image such that a sense of discomfort in stereoscopic viewing is suppressed or alleviated.

These and other objects, features, aspects and advantages of the present invention will become more apparent from the following detailed description of the present invention when taken in conjunction with the accompanying drawings.

DESCRIPTION OF THE PREFERRED EMBODIMENTS (Structure Example of Game Apparatus)

Figure 1:
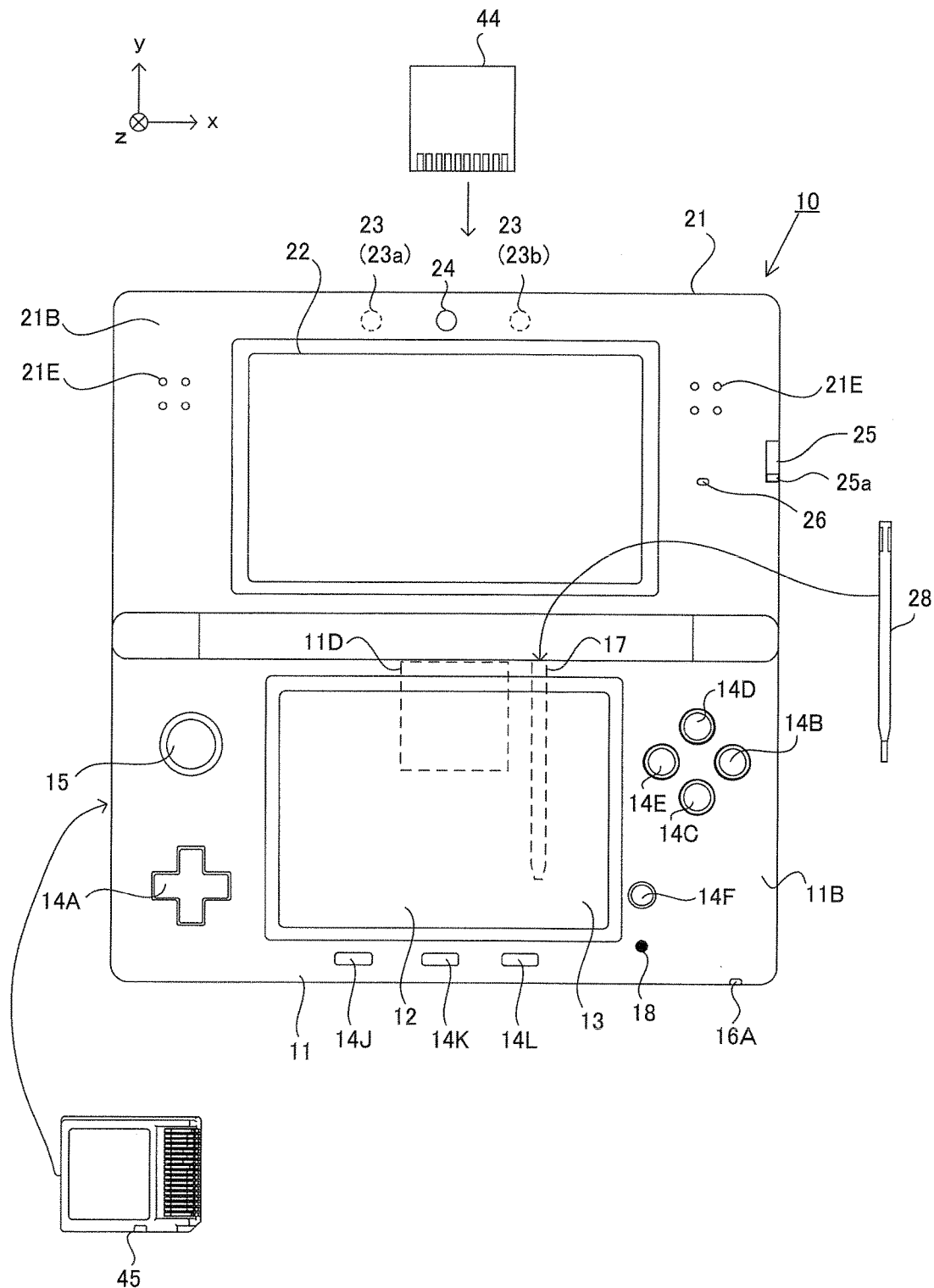
FIG. 1 is a front view of a game apparatus 10 in an opened state.
Figure 2:
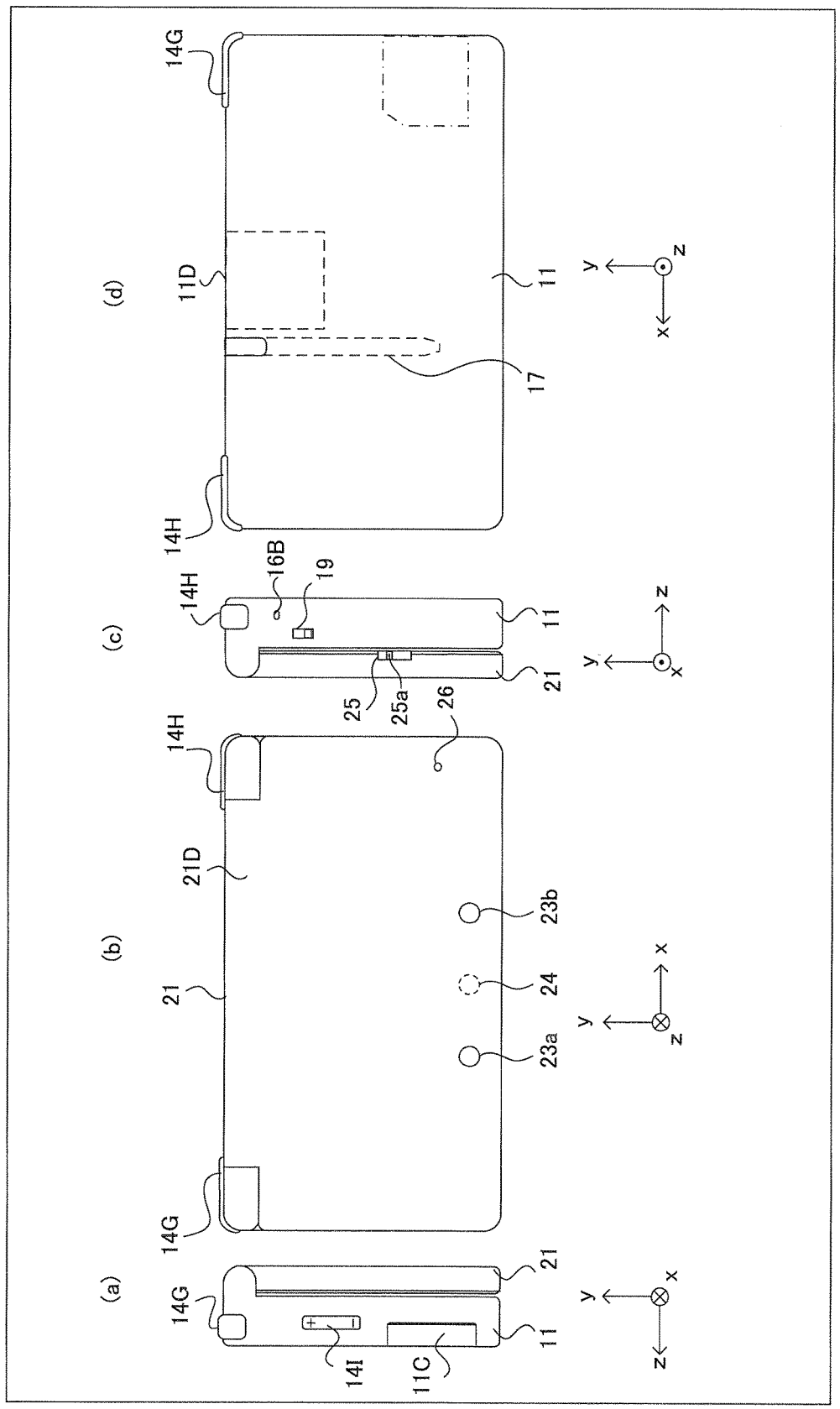
FIG. 2 is a left side view, a front view, a right side view, and a rear view of the game apparatus 10 in a closed state.

Hereinafter, a game apparatus according to one embodiment of the present invention will be described. FIGS. 1 and 2 are each a plan view of an outer appearance of a game apparatus 10. The game apparatus 10 is a hand-held game apparatus, and is configured to be foldable as shown in FIGS. 1 and 2. FIG. 1 shows the game apparatus 10 in an opened state, and FIG. 2 shows the game apparatus 10 in a closed state. FIG. 1 is a front view of the game apparatus 10 in the opened state. The game apparatus 10 is able to take an image by means of an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

Initially, an external structure of the game apparatus 10 will be described with reference to FIGS. 1 and 2. The game apparatus 10 includes a lower housing 11 and an upper housing 21 as shown in FIGS. 1 and 2. The lower housing 11 and the upper housing 21 are connected to each other so as to be openable and closable (foldable).

(Description of Lower Housing)

Initially, a structure of the lower housing 11 will be described. As shown in FIGS. 1 and 2, in the lower housing 11, a lower LCD (Liquid Crystal Display) 12, a touch panel 13, operation buttons 14A to 14L, an analog stick 15, an LED 16A and an LED 16B, an insertion opening 17, and a microphone hole 18 are provided. Hereinafter, these components will be described in detail.

As shown in FIG. 1, the lower LCD 12 is accommodated in the lower housing 11. The number of pixels of the lower LCD 12 may be, for example, 320 dots×240 dots (the longitudinal line×the vertical line). The lower LCD 12 is a display device for displaying an image in a planar manner (not in a stereoscopically visible manner), which is different from the upper LCD 22 as described below. Although an LCD is used as a display device in the present embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 may be, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIGS. 1 and 2(d)) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A is cross-shaped, and includes buttons for indicating an upward, a downward, a leftward, or a rightward direction. The button 14A to 14E, the selection button 14J, the HOME button 14K, and the start button 14L are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction. The analog stick 15 has a top, corresponding to a key, which slides parallel to the inner side surface of the lower housing 11. The analog stick 15 acts in accordance with a program executed by the game apparatus 10. For example, when a game in which a predetermined object appears in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Further, the microphone hole 18 is provided on the inner side surface of the lower housing 11. Under the microphone hole 18, a microphone 42 (see FIG. 3) is provided as a sound input device described below, and the microphone 42 detects for a sound from the outside of the game apparatus 10.

FIG. 2(a) is a left side view of the game apparatus 10 in the closed state. FIG. 2(b) is a front view of the game apparatus 10 in the closed state. FIG. 2(c) is a right side view of the game apparatus 10 in the closed state. FIG. 2(d) is a rear view of the game apparatus 10 in the closed state. As shown in FIGS. 2(b) and 2(d), an L button 14G and an R button 14H are provided on the upper side surface of the lower housing 11. The L button 14G and the R button 14H act, for example, as shutter buttons (imaging instruction buttons) of the imaging section. Further, as shown in FIG. 2(a), a sound volume button 14I is provided on the left side surface of the lower housing 11. The sound volume button 14I is used for adjusting a sound volume of a speaker of the game apparatus 10.

As shown in FIG. 2(a), a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10.

Further, as shown in FIG. 2(d), an insertion opening 11D through which an external memory 44 having a game program stored therein is inserted is provided on the upper side surface of the lower housing 11. A connector (not shown) for electrically connecting between the game apparatus 10 and the external memory 44 in a detachable manner is provided inside the insertion opening 11D. A predetermined game program is executed by connecting the external memory 44 to the game apparatus 10.

Further, as shown in FIGS. 1 and 2(c), a first LED 16A for notifying a user of an ON/OFF state of a power supply of the game apparatus 10 is provided on the lower side surface of the lower housing 11, and a second. LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication is established. The game apparatus 10 has a function of connecting to a wireless LAN in a method based on, for example, IEEE802.11b/g standard. A wireless switch 19 for enabling/disabling the function of the wireless communication is provided on the right side surface of the lower housing 11 (see FIG. 2(c)).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIGS. 1 and 2, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, theses components will be described in detail.

As shown in FIG. 1, the upper LCD 22 is accommodated in the upper housing 21. The number of pixels of the upper LCD 22 may be, for example, 800 dots×240 dots (the horizontal line×the vertical line). Although, in the present embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image. Further, in the present embodiment, an image for a left eye and an image for a right eye are displayed by using substantially the same display area.

Specifically, the upper LCD 22 may be a display device using a method in which the image for a left eye and the image for a right eye are alternately displayed in the horizontal direction in predetermined units (for example, every other line). Alternatively, a display device using a method in which the image for a left eye and the image for a right eye are alternately displayed for a predetermined time period may be used. Further, in the present embodiment, the upper LCD 22 is a display device capable of displaying an image which is stereoscopically visible with naked eyes. A lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD 22 of a parallax barrier type is used. The upper LCD 22 displays, by using the image for a right eye and the image for a left eye, an image (a stereoscopic image) which is stereoscopically visible with naked eyes. That is, the upper LCD 22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye.). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

The outer imaging section 23 is a generic term used to include two imaging sections 23a and 23b provided on the outer side surface 21D, which is a surface of the upper housing 21 that is opposite to the main surface having the upper LCD 22 mounted thereon. The imaging directions of the outer imaging section (left) 23a and the outer imaging section (right) 23b are each the same as the outward normal direction of the outer side surface 21D. The outer imaging section (left) 23a and the outer imaging section (right) 23b can be used as a stereo camera depending on a program executed by the game apparatus 10. Each of the outer imaging section (left) 23a and the outer imaging section (right) 23b includes an imaging device, such as a CCD image sensor or a CMOS image sensor, having a common predetermined resolution, and a lens. The lens may have a zooming mechanism.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. A slider 25a of the 3D adjustment switch 25 is slidable to any position in a predetermined direction (along the longitudinal direction of the right side surface), and a display mode of the upper LCD 22 is determined in accordance with the position of the slider 25a. In addition, a manner in which the stereoscopic image is visible is adjusted in accordance with the position of the slider 25a. Specifically, an amount of deviation in the horizontal direction between a position of an image for a right eye and a position of an image for a left eye is adjusted in accordance with the position of the slider 25a.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled. The 3D indicator 26 may be lit up only when the program processing for displaying a stereoscopically visible image is performed in a state where the upper LCD 22 is in the stereoscopic display mode.

Further, a speaker hole 21E is provided on the inner side surface of the upper housing 21. A sound is outputted through the speaker hole 21E from a speaker 43 descried below.

(Internal Configuration of Game Apparatus 10)

Figure 3:
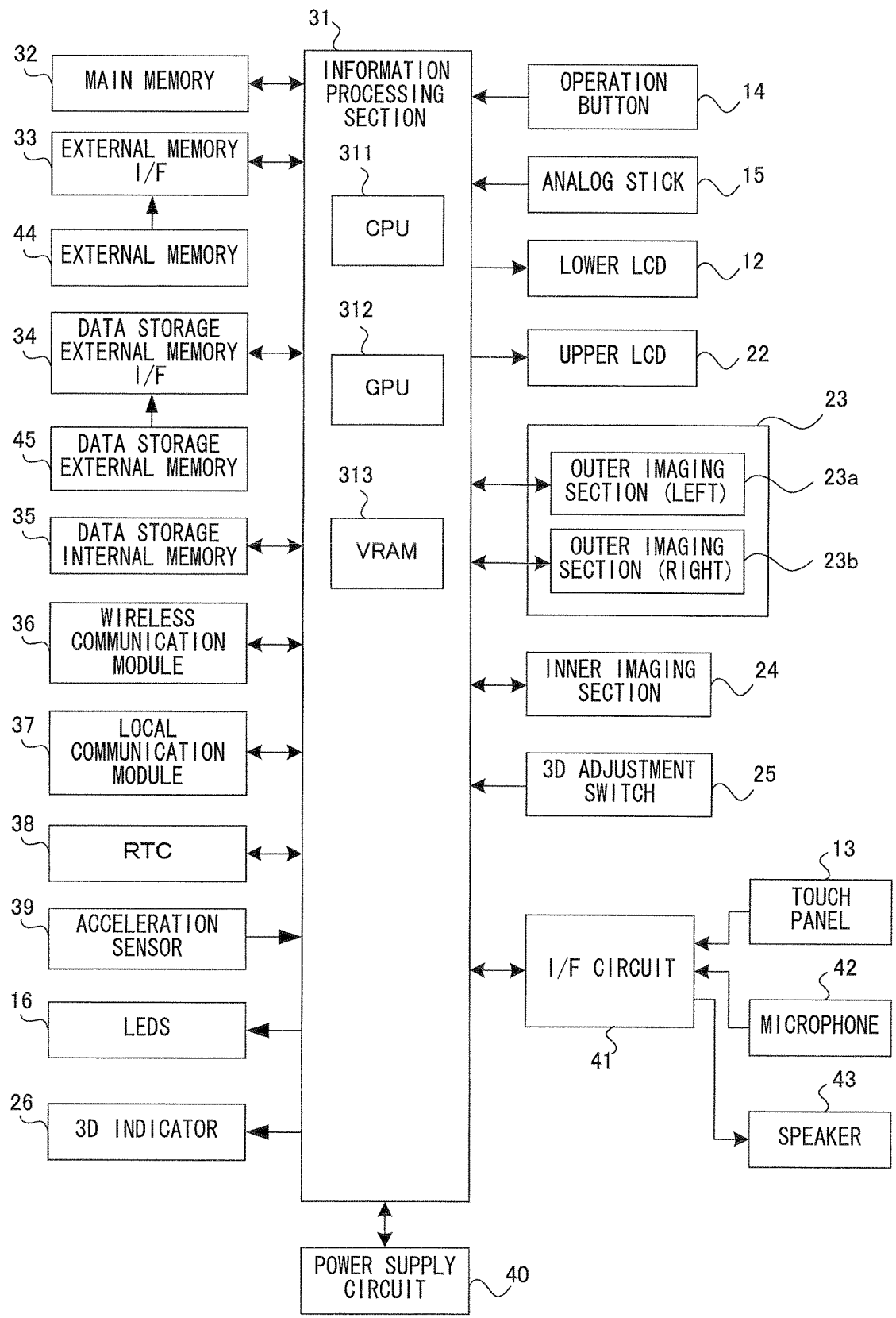
FIG. 3 is a block diagram showing an internal configuration of the game apparatus 10.

Next, an internal electrical configuration of the game apparatus 10 will be described with reference to FIG. 3. FIG. 3 is a block diagram illustrating an internal configuration of the game apparatus 10. As shown in FIG. 3, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. The CPU 311 of the information processing section 31 executes a program stored in a memory (for example, the external memory 44 connected to the external memory I/F 33 or the internal data storage memory 35) inside the game apparatus 10, thereby executing processing corresponding to the program. The program executed by the CPU 311 of the information processing section 31 may be acquired from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

The main memory 32, the external memory I/F 33, the external data storage memory I/F 34, and the internal data storage memory 35 are connected to the information processing section 31. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the processing based on the above program, and temporarily stores a program acquired from the outside (the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, communication based on a unique protocol, or infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial (xyz axial) directions, respectively. The acceleration sensor 39 is provided inside the lower housing 11. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 can receive data (acceleration data) representing accelerations detected by the acceleration sensor 39, and detect an orientation and a motion of the game apparatus 10.

The RTC 38 and the power supply circuit 40 are connected to the information processing section 31. The RTC 38 counts time, and outputs the time to the information processing section 31. The information processing section 31 calculates a current time (date) based on the time counted by the RTC 38. The power supply circuit 40 controls power from the power supply (the rechargeable battery accommodated in the lower housing 11 as described above) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier which is not shown. The microphone 42 detects a voice from a user, and outputs a sound signal to the I/F circuit 41. The amplifier amplifies a sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made. The touch panel control circuit reads a signal outputted from the touch panel 13, and generates the touch position data every predetermined time. The information processing section 31 acquires the touch position data, to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 acquires the operation data from the operation button 14 to perform processing in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 causes the lower LCD 12 to display a stereoscopic image (stereoscopically visible image).

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye which are stored in the VRAM 313 of the information processing section 31 are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31.

The 3D adjustment switch 25 is connected to the information processing section 31. The 3D adjustment switch 25 transmits, to the information processing section 31, an electrical signal in accordance with the position of the slider 25a.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode. Description thus far is for the internal configuration of the game apparatus 10.

(Exemplified Embodiments of Display Control Program)

Next, the outline of control processing for an image to be stereoscopically displayed on the upper LCD 22 of the game apparatus 10, which is performed in processing based on a display control program 70 according to an exemplified embodiment of the present invention, will be described with reference to FIG. 4 to FIG. 7.

Figure 4:
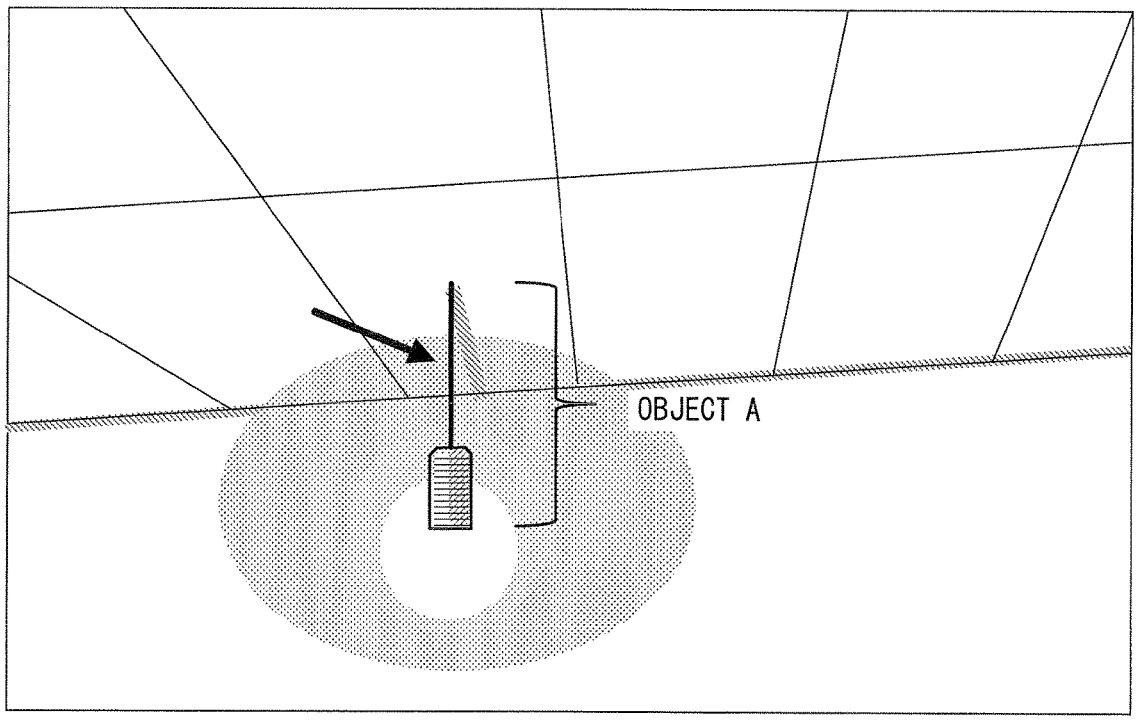
FIG. 4 is a schematic diagram showing an example of an object displayed on an upper LCD 22 of the game apparatus 10.

FIG. 4 is a schematic diagram showing an example of an object displayed on the upper LCD 22 of the game apparatus 10. In FIG. 4, a virtual object A is displayed on the upper LCD 22 in a state in which the parallax barrier is set to OFF by the CPU 311. In FIG. 4, the outer frame line represents a display area of the upper LCD 22, and a longitudinal direction on the drawing is the direction parallel to a direction along horizontal separation between eyes of its user (hereafter the direction is referred to as "binocular disparity direction"). The virtual object A displayed on the upper LCD 22 is an object resembling a lighting apparatus, and is represented by a model including: a thin and long string-shaped member (part indicated by an arrow in FIG. 4) extending in the vertical direction from a ceiling provided in a virtual space; and a body portion attached to the string-shaped member.

First, a case where processing based on an exemplified display control program of the present invention is not performed will be described by using, as an example, the virtual object A shown in FIG. 4 with reference to FIG. 5, in order to make comparison with a case where the processing based on the exemplified display control program is performed.

Figure 5:
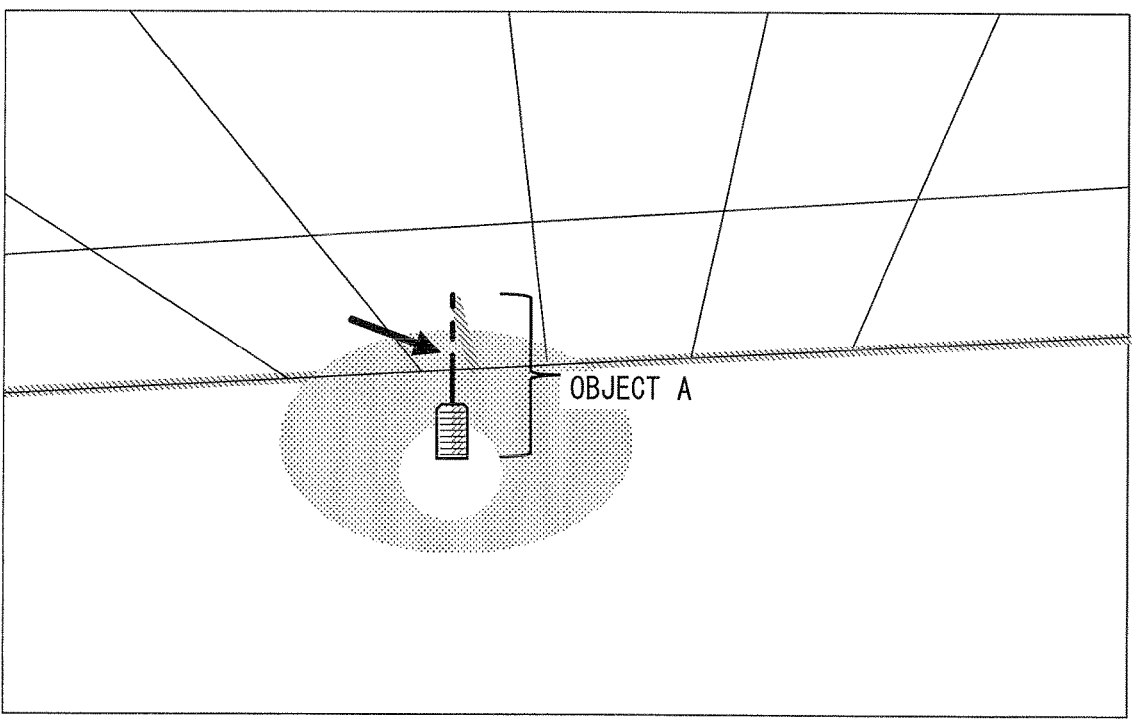
FIG. 5 shows an example of an image for a left eye obtained by using conventional display control processing in a case where the distance between the position of a virtual object A and a viewpoint (the position of a left virtual camera) is longer than that in FIG. 4.

FIG. 5 shows an example of an image for a left eye obtained by using conventional display control processing in a case where the distance between the position of the virtual object A and the viewpoint (the position of a left virtual camera) is longer than that in FIG. 4. Specifically, FIG. 5 is a schematic diagram exemplifying an image for a left eye that indicates a 3-dimensional virtual space when the distance from the viewpoint (the position of a left virtual camera) to the virtual object A has become longer than that in FIG. 4 after a virtual space (world coordinate system)

including the virtual object A has been subjected to perspective transformation. In this example, the virtual object A placed in the virtual space is displayed with the string-shaped member thereof disappearing at several portions owing to the positional relationship between the virtual object A and the viewpoint, and the like.

In this example, the string-shaped member of the virtual object A extending in the direction perpendicular to the binocular disparity direction is likely to be displayed in a state where the string-shaped member disappears at several portions when the distance between the string-shaped member and the viewpoint is equal to or larger than a certain value, because the length of the string-shaped member in the binocular disparity direction is narrow. That is, the string-shaped member of the virtual object A is short in its length in the binocular disparity direction, relative to the length in the binocular disparity direction of the display area of the display apparatus. Therefore, the string-shaped member can partially disappear on the image for a left eye displayed on the upper LCD 22 when the distance from the viewpoint to the string-shaped member has become longer after the perspective transformation. In addition, the same phenomenon is likely to occur also on the image for a right eye, though FIG. 5 shows an example of the image for a left eye.

Moreover, in a state in which a virtual object is partially not displayed on each image as described above, a difference can occur between the image for a right eye and the image for a left eye. That is, a virtual object narrow in its length in the binocular disparity direction is likely to have a portion that is not displayed on each image when the distance from the viewpoint to the virtual object is long. Furthermore, the position of the portion that is not displayed on an image is sometimes different between the image for a right eye and the image for a left eye which are paired for stereoscopic viewing.

In the case where a portion that is not displayed on an image is different between the image for a right eye and the image for a left eye which are paired, when the paired images are displayed on the upper LCD 22 in order to provide a stereoscopic view, the user can feel a sense of discomfort owing to the difference between the image for a right eye and the image for a left eye. When the image for a right eye and the image for a left eye are different in whether or not a portion of the virtual object is displayed (when the position of a portion of the virtual object that disappears, for example, as shown by an arrow in FIG. 5 is different between the image for a right eye and the image for a left eye), the user feels a sense of discomfort, which is caused by flicker or the like.

The following will describe a case where: the positional relationship between the virtual object A and the viewpoint is the same as in FIG. 5; and the processing based on the exemplified display control program of the present invention is performed. When the processing based on the exemplified display control program of the present invention is performed, a sense of discomfort as described above is suppressed or eliminated. A specific procedure of processing will be described with reference to a flowchart shown in the drawings described later. Here, technical features for reducing a sense of discomfort in stereoscopic viewing by the processing based on the display control program will be briefly described.

Figure 6:
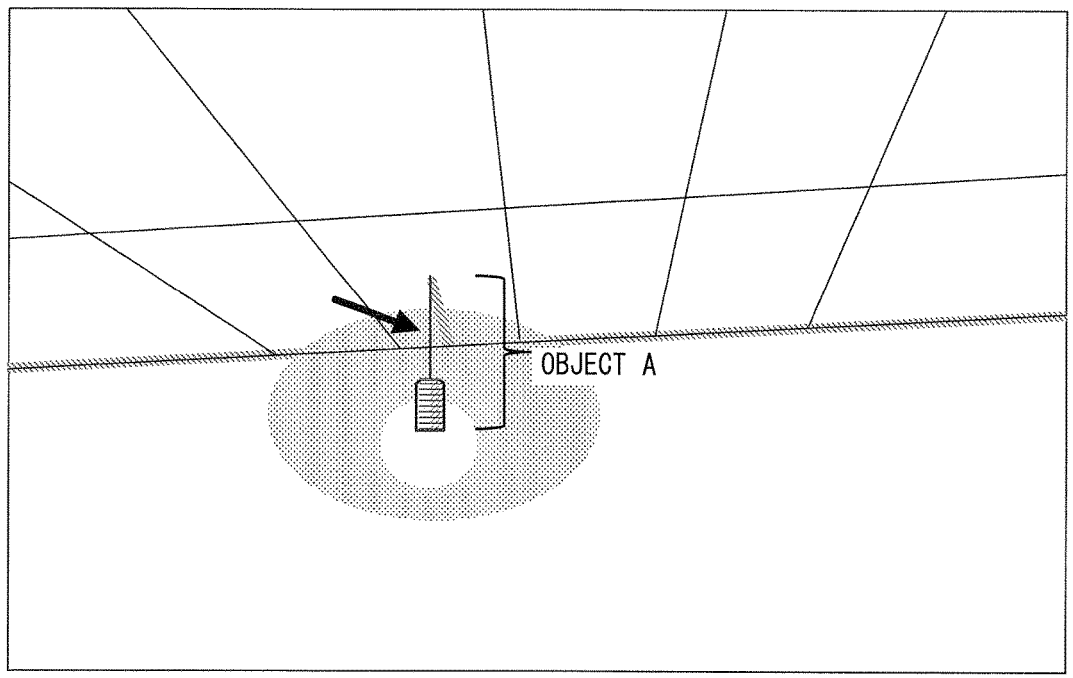
FIG. 6 is a schematic diagram showing an example of an image for a left eye obtained when processing based on a display control program is performed.

FIG. 6 schematically shows an example of the image for a left eye obtained when the processing based on the exemplified display control program is performed. Specifically, FIG. 6 shows an example of the image for a left eye that has been subjected to the processing based on the exemplified display control program, in the case where a positional relationship (distance) between the position of the virtual object A and the viewpoint (the position of the left virtual camera) is the same as in FIG. 5. In FIG. 6, the string-shaped member of the virtual object A is displayed in a state in which the portion that has not been displayed in the example in FIG. 5 is hardly distinguishable from the other portions that have been displayed in the example in FIG. 5, in order to make a display manner of the string-shaped member more suitable to stereoscopic viewing. This is realized by setting information about the degree of transparency specified in the alpha channel such that the degrees of transparency of pixels for displaying the virtual object A increase in proportion to the distance between the virtual object A and the viewpoint. In addition, in the same manner as in FIG. 6, the string-shaped member of the virtual object A on the image for a right eye, which is paired with the image for a left eye, is as follows. That is, the portion that has not been displayed before the setting of the degree of transparency is hardly distinguishable from the other portions that have been displayed.

In a method of setting information about the degree of transparency in an alpha channel performed in the processing based on the exemplified display control program, the information about the degree of transparency (hereinafter, referred to as an alpha value) may be set in attribute information about a model specifying the virtual object A, or may be set in a texel of a texture to be mapped to the model. That is, it is necessary that the alpha value of a pixel representing a virtual object displayed on the upper LCD 22 is controlled such that the larger the distance between the virtual object and the viewpoint (the position of the virtual camera) is, the higher the degree of transparency is. Such a configuration suppresses a sense of discomfort caused by an occurrence of a difference in displayed portions of the virtual object on the upper LCD 22 between the image for a right eye and the image for a left eye.

In FIG. 6, the processing based on the exemplified display control program has been described by using the virtual object A as an example. However, as a matter of course, an application of the processing based on the exemplified display control program is not limited to a string-shaped member.

Figure 7:
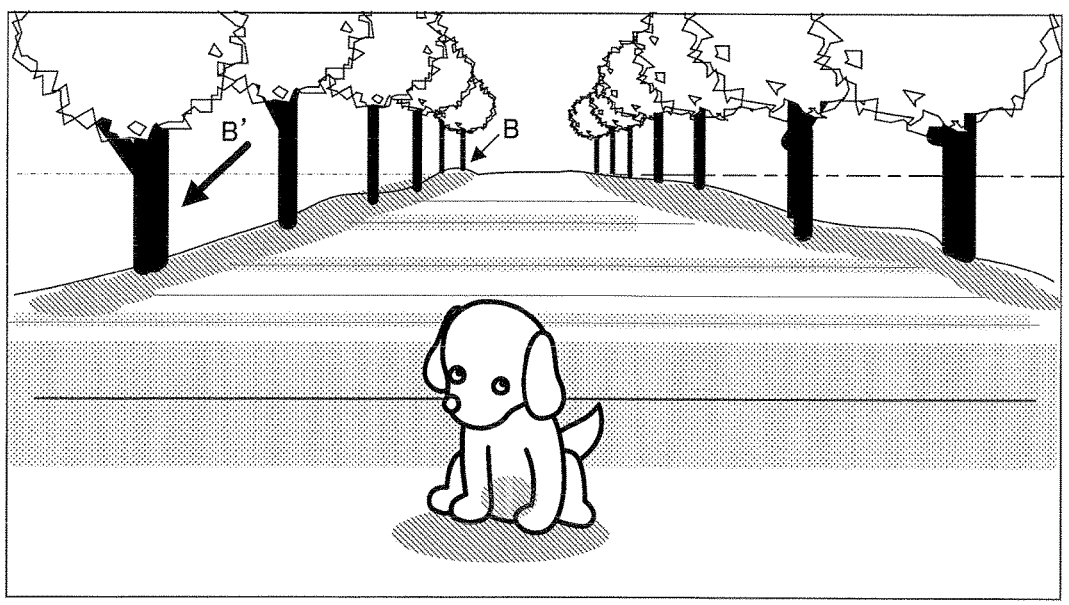
FIG. 7 is a schematic diagram showing an example of an image obtained by performing perspective transformation processing for a 3-dimensional virtual space including a plurality of trees (models thereof) placed along a path extending in the depth direction from the front.

FIG. 7 is an example of an image obtained by performing perspective transformation processing for a 3-dimensional virtual space including a plurality of trees (models thereof) placed along a path extending in the depth direction from the front. The plurality of trees have stems that are almost the same in their sizes and are thin-and-long shaped as a whole. As shown in FIG. 7, in comparison between a tree model B' placed in the front and the tree model B placed in the distance, the tree model B which is far from the viewpoint is represented as a thinner stem. In addition, a tree model placed farther than the tree model B is depicted so as to be thinner than the tree model B (that is, depicted such that the length in the binocular disparity direction is narrower). In the case where, for example, such a thin stem is depicted so as to have a length, in the binocular disparity direction, corresponding to unit display area (one pixel) on the upper LCD 22, the thin stem might not be displayed (on the image for a right eye or the image for a left eye) depending on the position of the viewpoint (that is, the image for a right eye and the image for a left eye are likely to be different in whether or not the thin stem is displayed). Even in this case, an occurrence of a difference, in whether or not a virtual object is displayed, between the image for a right eye and the image for a left eye is suppressed by performing the processing based on the above-described display control program, that is, by making setting such that the farther from the viewpoint the virtual object is, the higher the degree of transparency is.

(Memory Map)

Figure 8:
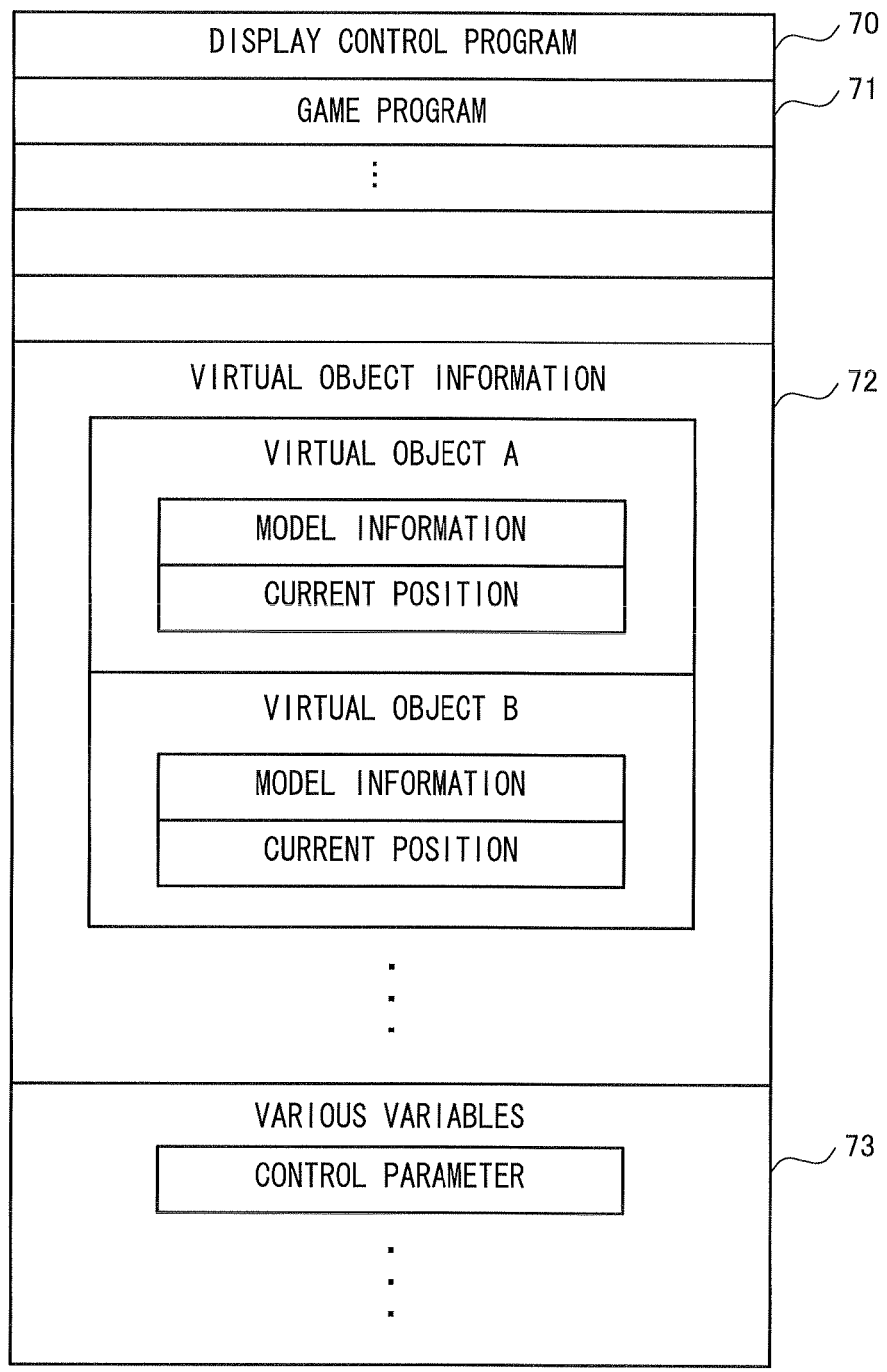
FIG. 8 is a memory map exemplifying a storage area of the game apparatus 10.

Here, main data stored in the main memory 32 during execution of a game program will be described. FIG. 8 is a diagram showing a memory map of the main memory 32 of the game apparatus 10. As shown in FIG. 8, the main memory 32 stores a game program 71, a display control program 70, virtual object information 72, various variables 73, and the like.

The game program 71 is a program for causing the information processing section 31 to execute game display processing.

The display control program 70 is called in game processing based on the game program 71, or functions as a part of the game program 71, thereby performing processing of the exemplified embodiment of the present invention using alpha information.

The virtual object information 72 relates to virtual objects, and includes model information indicating shapes and patterns of virtual objects (for example, information about polygons), and information about the current positions of virtual objects in a virtual space, and the like.

The various variables 73 are used in executions of the game program 71 and the display control program 70.

(Exemplified Flow of Processing)

Figure 9A:
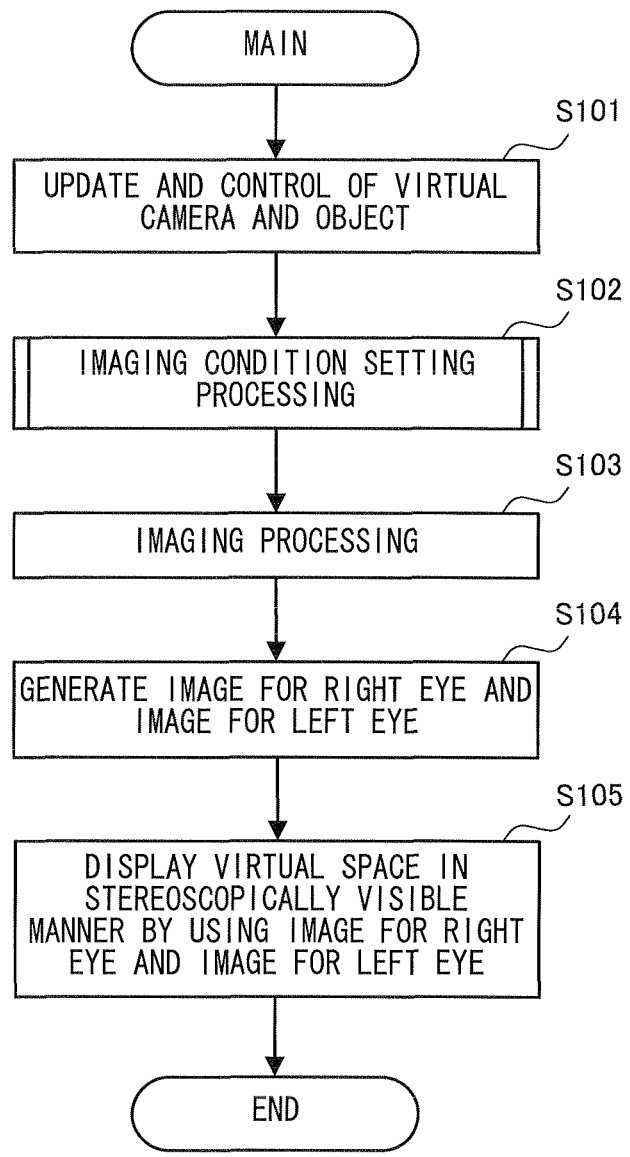
FIG. 9A is a flowchart for explaining main processing based on the display control program of an exemplified embodiment of the present invention.

Hereinafter, with reference to flowcharts in FIG. 9A and the subsequent drawings, a flow of processing executed based on the display control program of the exemplified embodiment of the present invention will be described. In FIG. 9A and the subsequent drawings, "step" is abbreviated to "S". It is noted that the flowcharts in FIG. 9A and the subsequent drawings are merely examples of processing procedure. Therefore, the order of the processing steps may be changed as long as the same result is obtained. In addition, the values of the variables, and threshold values used in determination steps are also merely examples, and other values may be adopted as necessary. In addition, in the present embodiment, the CPU 311 executes processing in all steps of each flowchart in FIG. 9A and the subsequent drawings. However, a processor or a dedicated circuit other than the CPU 311 may execute processing in a part of steps in each flowchart in FIGS. 9A and 9B.

FIG. 9A is a flowchart for explaining main processing performed in display control based on the display control program 70 of the exemplified embodiment of the present invention.

The CPU 311 executes the display control program 70 called by the game program 71 executed on the game apparatus 10, or executes the display control program 70 as a part of the game program 71. The CPU 311 performs a series of processing steps for visualizing data (virtual object information) representing a 3-dimensional virtual space and virtual objects placed therein. Data about virtual objects to be displayed is stored as the virtual object information 72.

In step 101, the CPU 311 performs processing of updating and controlling the positions in the 3-dimensional virtual space of a virtual camera and a virtual object.

Specifically, in accordance with a content of a request by the game program 71, the CPU 311 performs processing of extracting 3-dimensional model information (for example, a polygon model representing the virtual object A) about a virtual object stored in the virtual object information 72, and placing the virtual object in the 3-dimensional virtual space (based on a world coordinate system). The CPU 311 performs processing (perspective transformation processing) of transforming information based on the world coordinate system in which the virtual object is placed, into information based on a coordinate system looked at from the viewpoint (the position of the virtual camera). Thus, in accordance with a content of a request by the game program 71, the CPU 311 updates the positions in the 3-dimensional virtual space of the virtual camera and the placed virtual object.

Based on the updated positions, the CPU 311 performs a series of rendering processings for visualizing the 3-dimensional virtual space including the virtual object and displaying the 3-dimensional virtual space on a display apparatus (for example, the upper LCD 22), in subsequent steps. Examples of the rendering processings include hidden line removal, hidden surface removal, shadowing, shading, and mapping. The CPU 311 sets conditions for the rendering processing, in subsequent step 102 and the like.

In step 102, the CPU 311 performs imaging condition setting processing. The details of this processing is defined by a flowchart in FIG. 9B described later. In general, the CPU 311 performs condition setting associated with the distance between the updated position of the virtual camera and a virtual object to be processed. After processing in step 102 is completed, the CPU 311 proceeds to step 103.

In step 103, the CPU 311 performs processing of imaging, e.g. rendering, the 3-dimensional virtual space including the virtual object to be displayed, in accordance with the condition set in the imaging condition setting processing. It is noted that in next step 104, the CPU 311 performs, as necessary, imaging processing based on a plurality of conditions that are different in viewpoint and the like, in order to generate an image for a right eye and an image for a left eye for providing a stereoscopic view to the user.

In step 104, the CPU 311 generates an image for a right eye and an image for a left eye for providing a stereoscopic view to the user. The CPU 311 generates the image for a right eye and the image for a left eye such that the images are optimized for a display apparatus using a parallax barrier method, based on imaging-related information in step 103. As a matter of course, the CPU 311 may perform the processing in step 104 by adopting another method for providing a stereoscopic view.

In step 105, the CPU 311 displays, on the display apparatus, the 3-dimensional virtual space including the virtual object, by using the image for a right eye and the image for a left eye. The CPU 311 displays, on the upper LCD 22, an image (stereoscopic image) that is stereoscopically visible with naked eyes, by using an image for a right eye and an image for a left eye. That is, the upper LCD 22 allows the user to view the image for a left eye with her/his left eye, and the image for a right eye with her/his right eye by utilizing a parallax barrier, so that a stereoscopic image (a stereoscopically visible image) exerting a stereoscopic effect for a user can be displayed.

Figure 9B:
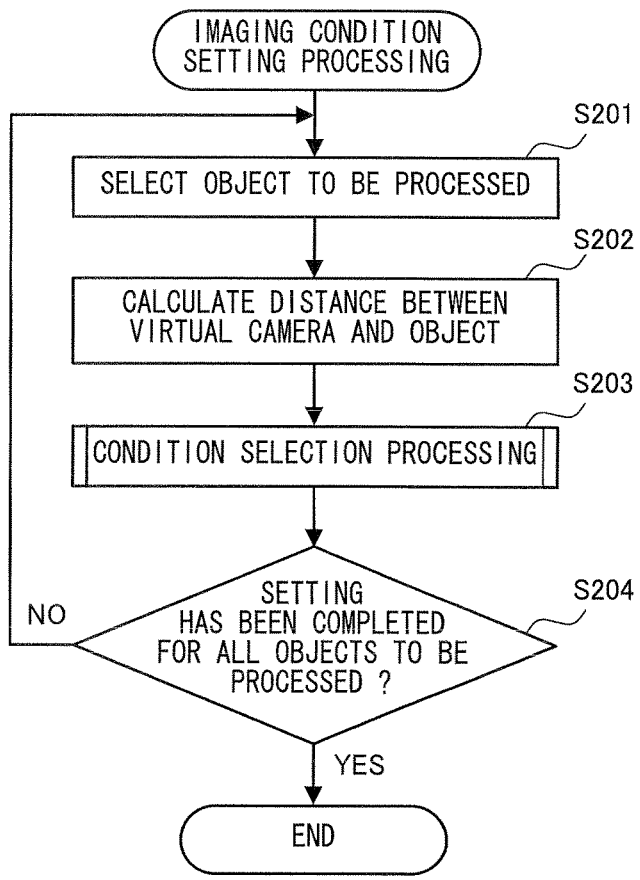
FIG. 9B is a flowchart for explaining an example of imaging condition setting processing shown in FIG. 9A.

FIG. 9B is a flowchart for explaining an example of the imaging condition setting processing in step 102 (FIG. 9A).

In step 201, the CPU 311 selects an object to be processed. For example, a virtual object that is narrow in its length in the binocular disparity direction relative to the length in the binocular disparity direction of the display area of the display apparatus (for example, a virtual object the part of or the entirety of which has a length, in the binocular disparity direction, of unit display area (one pixel or one dot) when the virtual object is displayed on the upper LCD 22), is specified in advance. Then, with reference to a table stored in advance in the various variables 73 (in the memory map), the CPU 311 selects a virtual object to be processed. Alternatively, the CPU 311 may sequentially select, as targets of processing, all objects that are present in a frame after perspective transformation.

In step 202, the CPU 311 calculates the distance from the virtual camera to the selected virtual object(s). Specifically, the CPU 311 calculates the distance from the virtual camera (the position of the viewpoint) to a representative point indicating the position of the virtual object to be processed placed in the 3-dimensional virtual space, after perspective transformation.

Here, the representative point is a given point that serves as a positioning reference for placing, in a 3-dimensional virtual space, a model representing the shape or the like of a virtual object (for example, a model of the virtual object A stored in the virtual object information 72 in the memory map). However, the CPU 311 may calculate the distance between the viewpoint and each of elements (for example, a vertex, a portion of a virtual object, and the like) specifying a placed model. In this case, processing to be performed for each virtual object in subsequent steps may be performed for each of the elements of the virtual object. In addition, "the position of the viewpoint" in the distance calculation may be any one of the positions of the right virtual camera and the left virtual camera, or may be the midpoint of the positions of the right virtual camera and the left virtual camera.

In step 203, the CPU 311 performs condition selection processing, based on the distance calculated in step 202. The details thereof will be described later with reference to FIG. 9C. After completing processing in step 203, the CPU 311 proceeds to step 204.

In step 204, the CPU 311 determines whether or not the imaging condition setting processing has been completed for all virtual objects to be processed. As a result of the determination, if the CPU 311 has determined that the imaging condition setting processing has been completed for all virtual objects to be processed (Yes in step 204), the CPU 311 completes the subroutine. On the other hand, if the CPU 311 has determined that the imaging condition setting processing has not been completed for all virtual objects to be processed (No in step 204), the CPU 311 returns to step 201 in order to perform processing in the same manner for another virtual object to be processed.

Figure 9C:
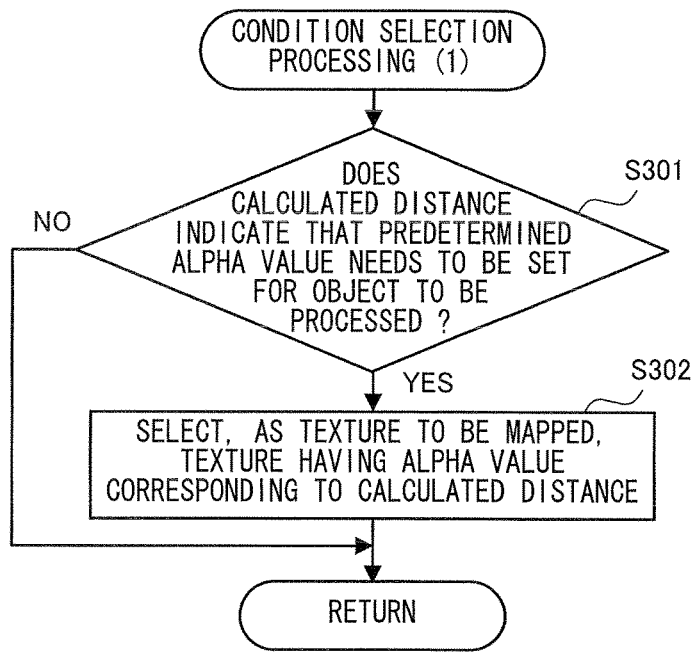
FIG. 9C is a flowchart for explaining an example of condition selection processing shown in FIG. 9B.

FIG. 9C is a flowchart for explaining an example (condition selection processing (1)) of condition selection processing in step 203 in FIG. 9B. In addition, FIGS. 9D and 9E are flowcharts for explaining variations (condition selection processings (2) and (3)) of the exemplified condition selection processing in FIG. 9C.

In step 301, the CPU 311 determines whether or not a predetermined alpha value needs to be set for displaying a virtual object to be processed, based on the distance calculated in step 202. With reference to the table and the like stored in the various variables 73 and the like, the CPU 311 determines a virtual object that is set in advance as a virtual object for which an alpha value is to be set for eliminating a sense of discomfort in stereoscopic viewing. As a result of the determination, if the CPU 311 has determined that an alpha value needs to be set (Yes in step 301), the CPU 311 proceeds to step 302. In the other case (No in step 301), the CPU 311 completes the processing, and proceeds to step 204 (FIG. 9B).

In step 302, the CPU 311 selects, as a texture to be mapped, a texture having an alpha value corresponding to the distance. An alpha value of a pixel representing a virtual object is controlled such that the larger the distance between the virtual object (or a part thereof) and the viewpoint (the position of the virtual camera) is, the larger the degree of transparency is.

Figure 9D:
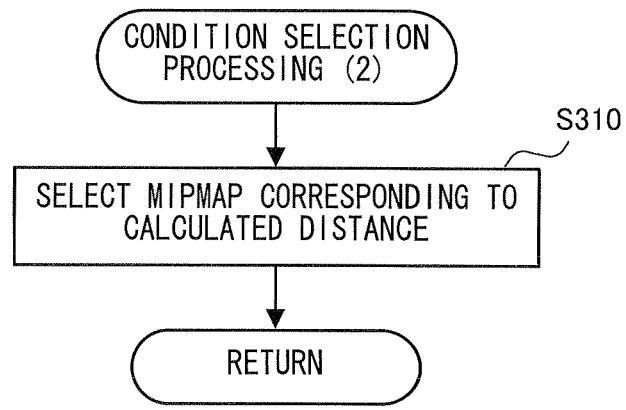
FIG. 9D is a flowchart for explaining a variation of the exemplified condition selection processing shown in FIG. 9C.
Figure 9E:
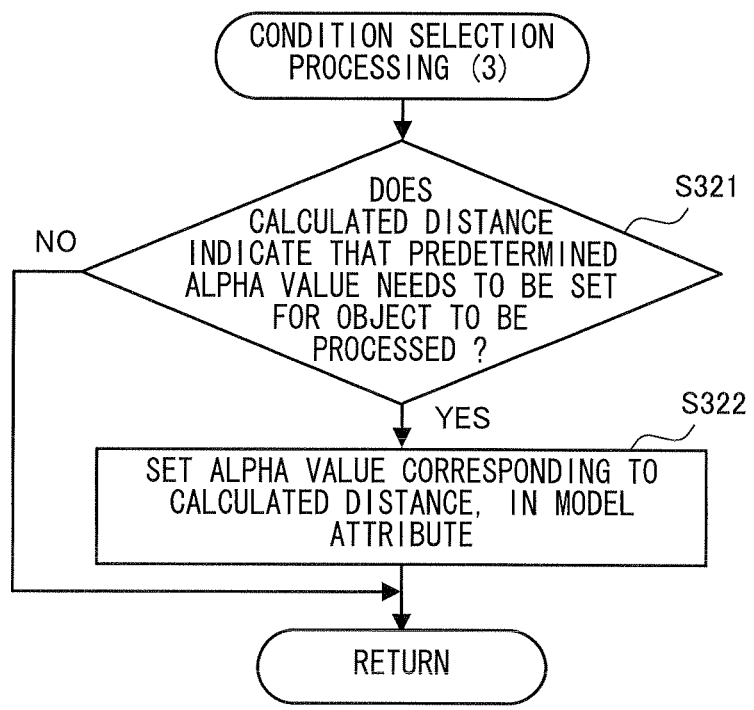
FIG. 9E is a flowchart for explaining a variation of the exemplified condition selection processing shown in FIG. 9C.

As shown in FIG. 9D, the condition selection processing may also be realized by the following procedure.

In step 310, in accordance with the distance calculated in step 202, the CPU 311 selects, for each virtual object, an image from mipmaps corresponding to respective lengths of the distance to the virtual object. It is noted that a correspondence relationship between mipmaps and a virtual object may be specified in accordance with an additional condition specified by performing the same determination as in step 301. Mipmaps are image group including a plurality of textures optimized so as to complement a main texture, and are used for selecting an image corresponding to the size of a virtual object that is a target of mapping. In the present embodiment, mipmaps optimized such that the degree of transparency is inclined to increase in proportion to the distance between a virtual object that is a target of mapping and the viewpoint (the position of the virtual camera), are used.

As shown in FIG. 9E, the condition selection processing may also be realized by the following procedure.

In step 321, the CPU 311 determines whether or not a predetermined alpha value needs to be set for displaying a virtual object to be processed, based on the distance calculated in step 202. The same determination as in step 301 is performed. In accordance with the determination, the CPU 311 determines whether or not to proceed to step 322.

In step 322, the CPU 311 sets an alpha value corresponding to the distance, in attribute information about a model specifying the shape and the like of a virtual object to be processed. The alpha value is optimized such that the degree of transparency is inclined to increase in proportion to the distance between a virtual object to be processed and the viewpoint (the position of the virtual camera). The attribute information about models of virtual objects is stored in a storage area of the game apparatus 10 that includes the virtual object information 72. The attribute information may include, besides information about the shape of each model, color information about points specifying the shape, an alpha value, and the like. The setting of an alpha value in the attribute information can be performed in this step, as long as the attribute information directly specifies the degrees of transparency of pixels, of a series of images generated for providing a stereoscopic view, displayed on the upper LCD 22.

(Other Respects)

In the exemplified embodiment described above, the display apparatus (upper LCD 22) that provides stereoscopic viewing with naked eyes is used. However, the display control program and the like of the present invention may be applied to display of a display apparatus using another method (for example, a stereo picture method, an anaglyph method, or a polarization method).

In the exemplified embodiment described above, the display control program 70 is used with the game apparatus 10. However, in another embodiment, the display control program may be used with any information processing apparatus or any information processing system (for example, a PDA (Personal Digital Assistant), a mobile phone, a personal computer, or a camera).

In addition, in the exemplified embodiment described above, the display control program is executed in game processing by using only one apparatus (game apparatus 10). However, in another embodiment, a plurality of information processing apparatuses, included in an image display system, that can communicate with each other may share the execution of the display control program.

It is noted that in the case where the display control program and the like of the present invention are used on a general-purpose platform, the display control program may be provided under the condition that a standard program module provided on the platform is used. It should be understood that even if a function corresponding to such a module as described above is excluded from the display control program, the resultant display control program substantially corresponds to the original display control program as long as the module complements the excluded function.

While the invention has been described in detail, the foregoing description is in all aspects illustrative and not restrictive. It is understood that numerous other modifications and variations can be devised without departing from the scope of the invention. It should be understood that the scope of the present invention is interpreted only by the scope of the claims. It is also understood that, from the description of specific embodiments of the present invention, the one skilled in the art can easily implement the present invention in the equivalent range based on the description of the present invention and on the common technological knowledge. Further, it should be understood that terms used in the present specification have meanings generally used in the art concerned unless otherwise specified. Therefore, unless otherwise defined, all the jargons and technical terms have the same meanings as those generally understood by one skilled in the art of the present invention. In the event of any confliction, the present specification (including meanings defined herein) has priority.

What is claimed is:

1. A non-transitory computer-readable storage medium having stored therein a display control program which is executed by a computer of a display control apparatus that displays a three-dimensional virtual space on a display apparatus capable of stereoscopic display, the display control program causing the computer to perform features comprising:
    placing virtual objects including a first object in the three-dimensional virtual space;
    specifying a distance between the first object placed in the three-dimensional virtual space and a viewpoint position based on positions of a left virtual camera and a right virtual camera used for virtually shooting the virtual space;
    setting, in accordance with the specified distance, a degree of transparency of a part or entirety of the first object such that the longer the distance is, the higher the degree of transparency is;
    generating an image for a right eye and an image for a left eye by shooting the three-dimensional virtual space with the right virtual camera and the left virtual camera, respectively, so that the first object, which is included in each of the image for a right eye and the image for a left eye, has the set degree of transparency; and
    displaying the generated image for the right eye and the generated image for the left eye on the display apparatus.

2. The non-transitory computer-readable storage medium having stored therein the display control program, according to claim 1, wherein the degree of transparency of the first object is set such that a display manner on the display apparatus of the first object in the image for a right eye, and a display manner on the display apparatus of the first object in the image for a left eye are equivalent.

3. The non-transitory computer-readable storage medium having stored therein the display control program, according to claim 1, wherein the degree of transparency is set in attribute data of a model specifying the first object.

4. The non-transitory computer-readable storage medium having stored therein the display control program, according to claim 1, wherein the degree of transparency of a texture image to be mapped to the first object is set.

5. The non-transitory computer-readable storage medium having stored therein the display control program, according to claim 4, wherein the display control program further causes the computer to perform functionality comprising selecting, based on the distance specified between the viewpoint position and the first object, one or more texture images from a plurality of texture images, having respective degrees of transparency, that are prepared in advance.

6. The non-transitory computer-readable storage medium having stored therein the display control program, according to claim 5, wherein the plurality of texture images are mipmaps.

7. The non-transitory computer-readable storage medium having stored therein the display control program, according to claim 1, wherein the first object has at least a portion whose length in a horizontal direction associated with binocular disparity caused when the image for a right eye and the image for a left eye are generated, is below a specified value relative to the length in the horizontal direction of a display area of the display apparatus.

8. The non-transitory computer-readable storage medium having stored therein the display control program, according to claim 7, wherein the length of the portion, which is below the specified value, corresponds to the length in the horizontal direction of unit display area in the display area.

9. The non-transitory computer-readable storage medium having stored therein the display control program, according to claim 7, wherein
    the display control program further causes the computer to perform functionality comprising:
    determining whether or not the first object has a portion whose length in the horizontal direction associated with binocular disparity caused when the image for a right eye and the image for a left eye are generated, is below the specified value relative to the length in the horizontal direction of the display area of the display apparatus, and
    setting the degree of transparency of the first object in accordance with the distance, when the first object has the portion whose length in the horizontal direction is below the specified value.

10. The non-transitory computer-readable storage medium having stored therein the display control program, according to claim 1, wherein the viewpoint position is the midpoint between the position of the right virtual camera and the position of the left virtual camera.

11. The non-transitory computer-readable storage medium having stored therein the display control program, according to claim 1, wherein the degree of transparency of the first object is set such that the degree of transparency increases by a certain amount as the length specified between the viewpoint and the first object increases by a certain amount.

12. The non-transitory computer-readable storage medium having stored therein the display control program, according to claim 1, wherein the degree of transparency changes with movement of the right virtual camera and/or the left virtual camera.

13. The non-transitory computer-readable storage medium according to claim 1, wherein the degree of transparency of the first object changes while a degree of transparency of one or more virtual objects remains unchanged.

14. A display control apparatus comprising at least one processor and configured to display a three-dimensional virtual space on a display apparatus capable of stereoscopic display, the display control apparatus configured to:
place virtual objects including a first object in the three-dimensional virtual space;
specify a distance between the first object placed in the three-dimensional virtual space and a viewpoint position based on positions of a left virtual camera and a right virtual camera used for virtually shooting the virtual space;
set, in accordance with the specified distance, a degree of transparency of a part or entirety of the first object such that the longer the distance is, the higher the degree of transparency is;
generate an image for a right eye and an image for a left eye by shooting the three-dimensional virtual space with the right virtual camera and the left virtual camera, respectively, so that the first object, which is included in each of the image for a right eye and the image for a left eye, has the set degree of transparency; and
display the generated image for the right eye and the generated image for the left eye on the display apparatus.

15. The display control apparatus of claim 14, wherein the degree of transparency changes with movement of the right virtual camera and/or the left virtual camera.

16. A display control system that displays a three-dimensional virtual space on a display apparatus capable of stereoscopic display, the display control system comprising:
a processing system having at least one processor, the processing system configured to:
place virtual objects including a first object in the three-dimensional virtual space,
specify a distance between the first object placed in the three-dimensional virtual space and a viewpoint position based on positions of a left virtual camera and a right virtual camera used for virtually shooting the virtual space;
set, in accordance with the specified distance, a degree of transparency of a part or entirety of the first object such that the longer the distance is, the higher the degree of transparency is;
generate an image for a right eye and an image for a left eye by shooting the three-dimensional virtual space with the right virtual camera and the left virtual camera, respectively, so that the first object, which is included in each of the image for a right eye and the image for a left eye, has the set degree of transparency, and
display the generated image for the right eye and the generated image for the left eye on the display apparatus.

17. The display control system of claim 16, wherein the degree of transparency changes with movement of the right virtual camera and/or the left virtual camera.

18. A display control method for displaying a three-dimensional virtual space on a display apparatus capable of stereoscopic display, the display control method comprising:
placing virtual objects including a first object in the three-dimensional virtual space;
specifying a distance between the first object placed in the three-dimensional virtual space and a viewpoint position based on positions of a left virtual camera and a right virtual camera used for virtually shooting the virtual space;
setting, in accordance with the specified distance, a degree of transparency of a part or entirety of the first object such that the longer the distance is, the higher the degree of transparency is;
generating an image for a right eye and an image for a left eye by shooting the three-dimensional virtual space with the right virtual camera and the left virtual camera, respectively, so that the first object, which is included in each of the image for a right eye and the image for a left eye, has the set degree of transparency; and
displaying the generated image for the right eye and the generated image for the left eye on the display apparatus.

19. The display control method of claim 18, wherein the degree of transparency changes with movement of the right virtual camera and/or the left virtual camera.

* * * * *